(12) United States Patent
Williams et al.

(10) Patent No.: US 9,609,137 B1
(45) Date of Patent: Mar. 28, 2017

(54) TRADING ENVIRONMENT RECORDING

(75) Inventors: Jamie Richard Williams, Fleet (GB); Marc Calahan, Woodstock, GA (US)

(73) Assignee: VERINT AMERICAS INC., Alpharetta, GA (US)

( * ) Notice: Subject to any disclaimer, the term of this patent is extended or adjusted under 35 U.S.C. 154(b) by 905 days.

(21) Appl. No.: 13/481,727

(22) Filed: May 25, 2012

Related U.S. Application Data

(60) Provisional application No. 61/490,795, filed on May 27, 2011.

(51) Int. Cl.
  *H04M 11/00* (2006.01)
  *H04M 3/53* (2006.01)

(52) U.S. Cl.
  CPC ........... *H04M 3/5307* (2013.01); *H04M 3/53* (2013.01)

(58) Field of Classification Search
  CPC .............................. H04M 3/533; H04M 7/005
  USPC ......................................... 379/88.17; 704/201
  See application file for complete search history.

(56) References Cited

U.S. PATENT DOCUMENTS

| | | | | |
|---|---|---|---|---|
| 6,249,570 B1 * | 6/2001 | Glowny | ................. | G11B 31/00 379/111 |
| 6,263,000 B1 * | 7/2001 | Kokubun | ...................... | 370/522 |
| 6,701,064 B1 | 3/2004 | De Haan et al. | | |
| 6,711,137 B1 | 3/2004 | Klassen et al. | | |
| 6,782,399 B2 | 8/2004 | Mosher, Jr. | | |
| 6,807,023 B2 | 10/2004 | Satoh et al. | | |
| 7,035,619 B1 | 4/2006 | Fargano et al. | | |
| 7,047,296 B1 * | 5/2006 | Safstrom | ........... | G06F 17/30017 379/112.01 |
| 7,085,377 B1 | 8/2006 | Norr | | |
| 7,286,652 B1 | 10/2007 | Azriel et al. | | |
| 7,561,778 B2 | 7/2009 | Kim et al. | | |
| 7,643,727 B2 | 1/2010 | Cho et al. | | |
| 7,647,459 B2 | 1/2010 | Zhang et al. | | |
| 7,720,353 B1 | 5/2010 | Jouppi | | |
| 7,852,994 B1 * | 12/2010 | Blair et al. | ................. | 379/88.17 |
| 7,869,700 B2 | 1/2011 | MacLean et al. | | |
| 8,102,976 B1 * | 1/2012 | Williams | ............ | H04M 1/2535 345/501 |
| 8,767,555 B1 * | 7/2014 | Xue et al. | ...................... | 370/238 |
| 2003/0221194 A1 | 11/2003 | Thiagarajan et al. | | |
| 2004/0143603 A1 | 7/2004 | Kaufmann et al. | | |
| 2004/0153504 A1 | 8/2004 | Hutchinson et al. | | |
| 2004/0215802 A1 * | 10/2004 | Amini et al. | ................. | 709/231 |
| 2004/0264929 A1 | 12/2004 | Lee et al. | | |
| 2004/0268408 A1 | 12/2004 | Lee et al. | | |

(Continued)

OTHER PUBLICATIONS

Notice of Allowance dated Sep. 23, 2011 in U.S. Appl. No. 12/181,919.

(Continued)

*Primary Examiner* — Shaun Roberts
(74) *Attorney, Agent, or Firm* — Meunier Carlin & Curfman

(57) ABSTRACT

Systems and methods for recording multiple channels of incoming data. Shared data may be centrally recorded, whereas unique data may be recorded at an endpoint, such as a workstation. A central recording system may request the unique data recorded at the endpoint and correlate it to the shared data. In some implementations, the data may be audio, where the shared data is audio played over speakers, whereas the unique data is audio at a handset of a workstation.

2 Claims, 6 Drawing Sheets

(56) References Cited

U.S. PATENT DOCUMENTS

| | | |
|---|---|---|
| 2006/0150229 A1* | 7/2006 | Blair et al. .................... 725/115 |
| 2006/0198504 A1* | 9/2006 | Shemisa et al. ......... 379/201.02 |
| 2006/0203807 A1* | 9/2006 | Kouretas et al. ............. 370/352 |
| 2006/0280197 A1* | 12/2006 | Stone ............................ 370/437 |
| 2007/0024705 A1 | 2/2007 | Richter et al. |
| 2007/0263783 A1* | 11/2007 | Speranza .......... H04M 3/42221 379/67.1 |
| 2007/0297578 A1* | 12/2007 | Blair et al. ................... 379/67.1 |
| 2008/0137814 A1* | 6/2008 | Williams ............. H04M 1/247 379/67.1 |
| 2008/0147826 A1 | 6/2008 | Velusamy et al. |
| 2008/0196078 A1 | 8/2008 | Steele et al. |
| 2008/0250153 A1 | 10/2008 | Claise et al. |
| 2009/0027401 A1 | 1/2009 | Loveridge et al. |
| 2009/0055548 A1 | 2/2009 | Williams et al. |

OTHER PUBLICATIONS

U.S. Official Action dated Jun. 2, 2011 in U.S. Appl. No. 12/181,919.

\* cited by examiner

TRADING ENVIRONMENT RECORDING

CROSS-REFERENCE TO RELATED APPLICATION

This application claims priority to U.S. Provisional Patent Application No. 61/490,795, filed May 27, 2011, entitled "Trading Environment Recording," which is incorporated herein by reference in its entirety.

BACKGROUND

Although electronic messaging applications (e.g., electronic mail (e-mail), instant messaging, chat applications) have revolutionized communication, in many business environments the telephone remains the predominant mode of communication. For example, trading rooms often have pressure to communicate information and receive a response over telephones in order to be as close to real time as possible and to avoid the delay introduced by most electronic communication media.

In particular, the activity in trading rooms is considered much more "peaky" than in traditional call centers. Bursts of frenzied activity can follow major events and these may last from a few seconds to a few hours. During these periods, the activity levels can be many times higher than the average load on the system. A recording system can be used in trading rooms in order to record transactions as they are occurring. Among other uses, recording systems can be helpful in recording transactions during frenzied periods of time, and should be able to perform reliably during such times. A reason for the reliability of a recording system is because during these brief "panics" traders may tend to ignore their computer systems and rely on the outcry going on around them to stay in touch. Trades are done verbally and scribbled down or remembered so that when the market calms down again, they can be entered into the computer systems. This can cause errors to arise.

Thus, a recording system can help to sort out the trades that occurred. As one example of a previous recording approach, recording capacity was connected to each trading desk rather than to the trunks entering or leaving the building. This is at least in part because the unusual topology of trading room systems (having more lines out of the building than there are desks) makes it more economical to connect recording capacity to each trading desk, and the major trading room system vendors have provided connectivity points to support such an arrangement.

Traditionally, recording systems have been priced according to the number of recording channels —which in a trading room system could all be live at once. This is because digital signal processing requirements, storage requirements, and cabling and interfacing costs have been proportional to the number of channels being recorded. Recording systems have been developed to minimize the channels being recorded by mixing together the data streams received by each trader. This led to the development of recording systems capable of mixing up to 8 input channels into a single composite recording channel. The techniques used for this included normalizing the signals with automatic gain control, mixing and then compressing the resultant signal.

Because the mistakes and disputes that arise within a recording system can be due to over-hearing or mis-hearing, the availability and quality of the recording can be used in resolving the dispute correctly. As an illustration, in a compliance recording environment, those data streams that could have been heard and therefore acted upon are recorded. These items can include speech not originally intended for the handset/microphone that it was heard on— e.g., trader hears "Buy" and acts on it even though it was being shouted into the other handset. Also, such recording systems were used to record even the first syllable of each "call"-since this call may be just a single word, shouted to the other party. Thus, trading room peculiarities led to, among other things, recording systems which were deliberately over-sensitive and hence recorded much low level audio that may well be just background noise as well as recording the main conversation on a line. Moreover, some recording systems used look-ahead buffers which enabled the system to filter out short spikes of electrical or acoustic noise, while still recording audio longer than a few tens of milliseconds.

SUMMARY

In accordance with the teachings provided herein, systems and methods for operation upon data processing devices are provided in order to overcome one or more of the aforementioned disadvantages or other disadvantages concerning recording multiple channels of incoming data. As an example of a system and method, multiple channels of incoming data (e.g., audio data) can be independently recorded, while reducing the number of superfluous copies of the multiple channels of incoming data. As another example, a system and method can be configured to provide for recording mixer settings for each of a number of users, such that the audio heard by each of the users can be recreated upon playback.

As another example, a device can be configured for recording multiple channels of incoming data. The device can receive audio, video and other data streams from a number of sources and distribute the data streams to computers based upon identifiers (e.g., addresses) associated with the workstations. The device reproduces the plurality of data streams, and transmits the data streams along with a recipient address for independent storage in a storage device. One or more workstation addresses are also stored with a data stream in order to determine the original recipient(s) of the data stream. Stored data streams are retrieved from the storage device through use of a recipient workstation address that is stored with a data stream and are provided based upon a request.

As another illustration, a system and method can be configured to receive multiple audio sources, the audio sources being respectively associated with inputs and outputs from the plurality of users; distribute the plurality of audio 'sources respectively to workstations associated with the users; and, record the plurality of sources for subsequent playback, thereby reducing superfluous recordings of a particular source among the plurality of audio sources.

One or more computer readable media can be used that contain software program code for recording voice traffic associated with a plurality of operator workstations. For example, a computer readable medium can contain distribution logic that is configured to receive multiple audio streams, the audio streams being associated with at least one of a number of operators. Distribution logic can further be configured to distribute the audio streams to those operators associated with the plurality of audio streams. Recording logic on the medium can be configured to reproduce the audio streams and record the audio streams independently

DETAILED DESCRIPTION OF THE DISCLOSURE

Figure 1:
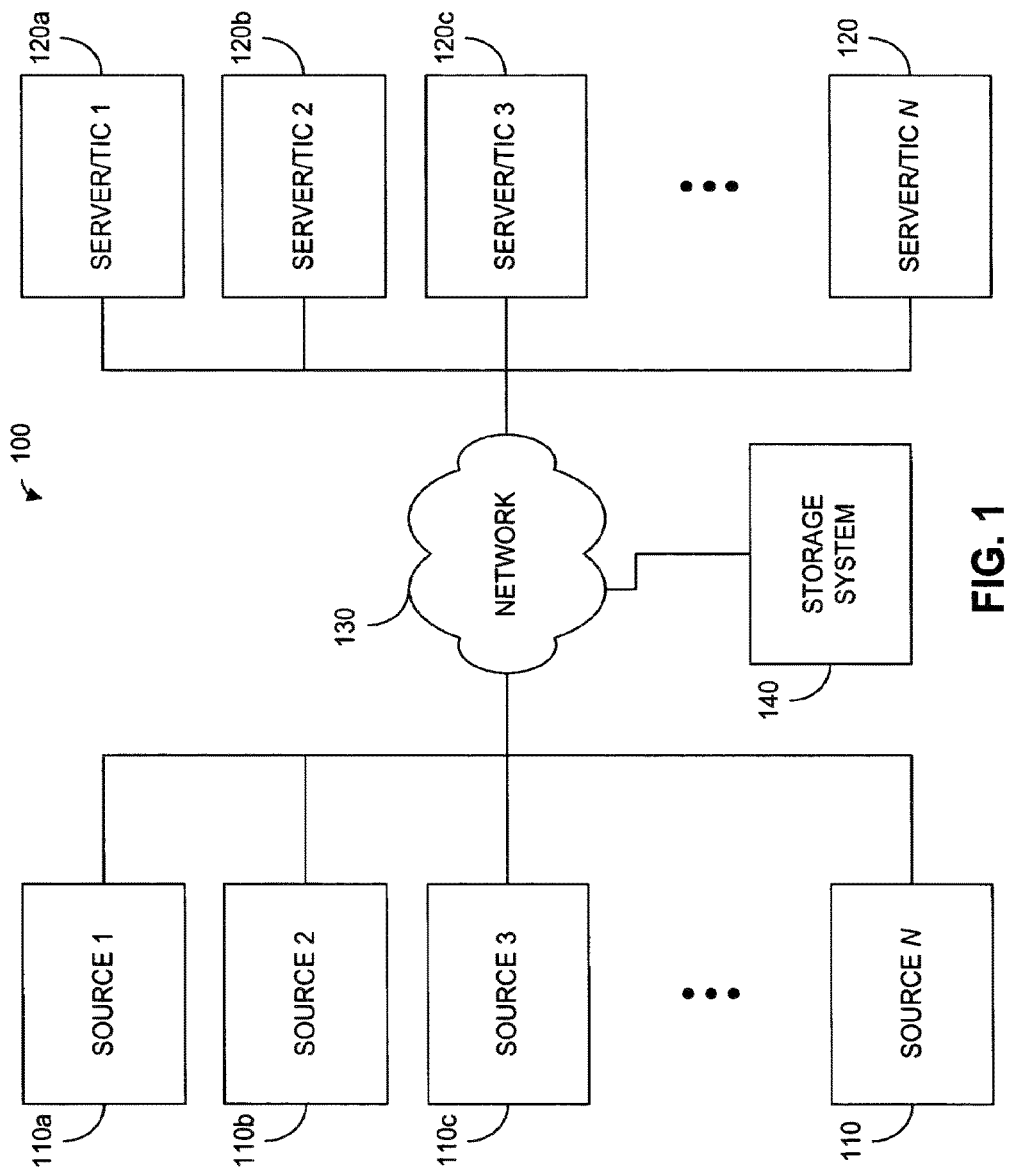
FIGS. 1 and 2 are block diagrams illustrating an example of a trading room environment.

FIG. 1 illustrates a configuration 100 of a trading room environment. Within the trading room environment, configuration 100 can include a number of sources 110a-c, which can send content to a number of servers 120a-c via a network 130. However, it should be understood that the configuration 100 can be used with many other environments, such as a call center environment.

Servers 120a-c can include recording logic for tapping the streams of data passing through servers 120a-c, as well as distribution logic for distributing the signals coming into servers 120a-c. Recording logic can communicate with the storage system 140 via the network 130.

Figure 2:
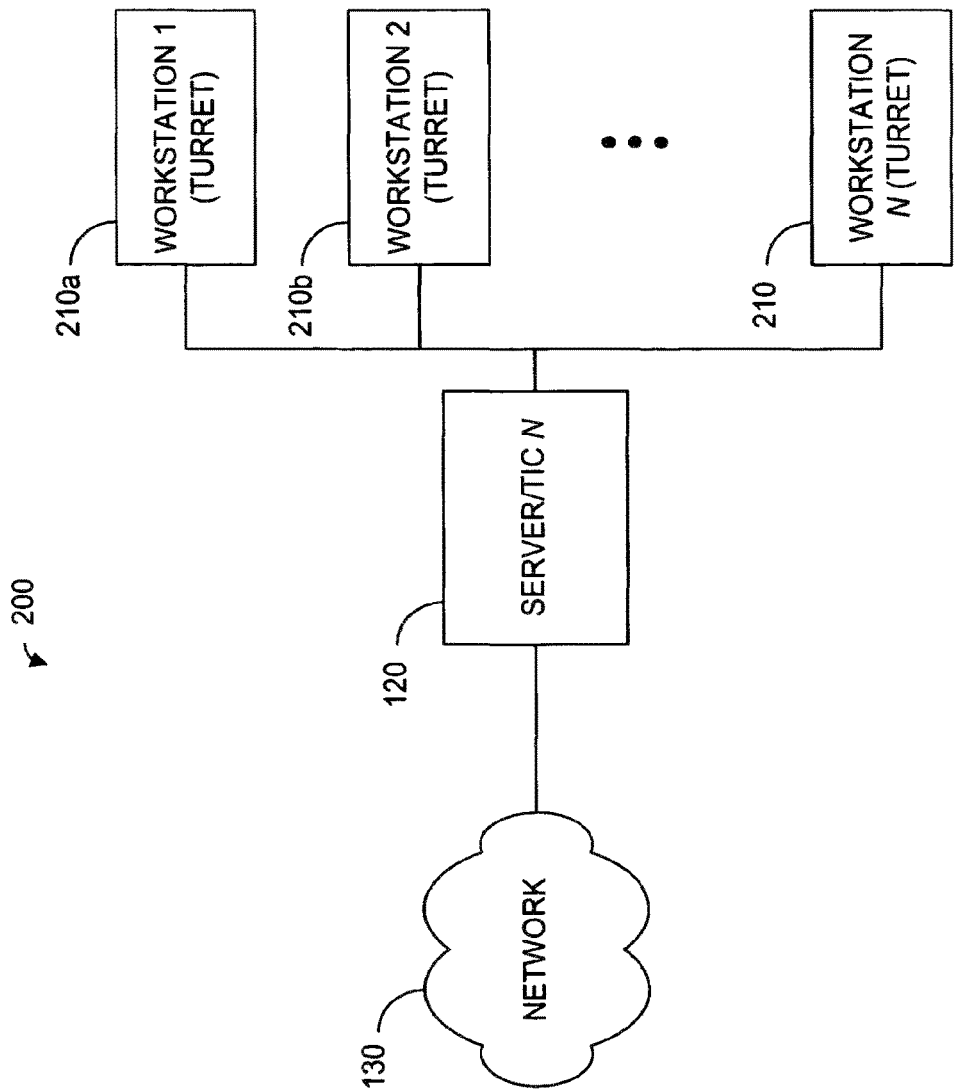

As shown in FIG. 2, upon a server 120 receiving source data streams, the server 120 can distribute the data streams out to a number of workstations 210a-b (e.g., turrets or terminals). The workstations can reside on a user's desk in one embodiment of the present disclosure. The trader uses the workstation to consummate trades, such as, for example, stock trades, commodity trades, bond trades, etc. However, it should be understood that a workstation can have many different types of configurations. As an illustration, a workstation can comprise a combination of the personal computer residing on the trader's desk and the turret (e.g. telephone system) that the trader uses to send or receive information to or from outside sources. It should be noted that a workstation can be the turret alone.

As mentioned above, this type of trading is subject to high volume peaks, which can occur shortly after the release of information. Moreover, because potentially large amounts of money are at stake, the server and recording logic can be configured to be reliable. For example, the server and recording logic can be configured such that a portion of the system could be broken, while still enabling the server and recording logic to operate properly.

Distribution software on the server can be configured to distribute a number of data streams to software installed and running on the users' workstations. While some of the data streams can be broadcast or multicast type data streams which are sent to the workstations connected to the server, other data streams can be addressed to a particular user. The former can be the case for newscasts, such as, for example, Headline News™, supplied by CNN, of Atlanta, Ga., while the latter can be the case with sources such as telephone calls. The sources can comprise myriad different entities. In the trading room environment for example, the source can be Headline News™, Lloyd's of London, a brokerage house, a clearing house, etc.

Distribution logic can be used on a server for sending information from the users on workstations 210a-b to various sources via the network. For example, the server can receive messages from the workstations 210a-b, translate the messages, and if necessary, send the information across the network 130 to a source 110. These messages, for example, can describe an outbound data stream, such as an audio data stream. It should be noted that the data stream can appear continuous to the trader, though it may actually be transformed into messages (e.g. packets). However, the messages could also be a call connection request, or some other sort of data transfer. Translation of data can occur when the connection is, for example, a telephone call, because the message may need to be converted from an internet protocol (IP) which transports the messages from the workstation to the server to another protocol, such as SS7 (C7), for transport across a public switched telephone network (PSTN).

Recording logic can be used to tap the individual source information streams passing through the server. Recording logic sends parallel signals to the storage system. The storage system in this embodiment comprises two storage areas, primary storage, and secondary storage. The primary storage receives the data streams from recording logic and immediately writes each of the data streams to memory independently. The secondary storage receives each of the data streams from recording logic, similarly to the primary storage. In addition to the data streams, the secondary storage can receive a "heartbeat" signal from the primary storage. The heartbeat signal indicates that the primary storage is functioning properly. In one embodiment of the present disclosure, the secondary storage writes each of the data streams to a buffer (volatile memory). After a period of time of receiving the data streams and receiving the heartbeat signal from the primary storage for the full duration of that period of time, the secondary storage can be configured to delete (or rewrite) the buffer.

However, if the heartbeat signal is not received by the secondary storage, the secondary storage may begin writing the data directly to non-volatile memory, until the heartbeat signal returns. An alarm may also be raised so that the problem with the primary storage system can be fixed quickly. Such an arrangement provides the storage system with reliable storage. Many different types of storage devices can be used for archiving large amounts of data, such as Centera, available from EMC Corp. of Hopkinton, Mass., or Tivoli Storage Manager available from IBM Corp. of White Plains, N.Y. Alternatively, it should be noted that each of a primary storage area and a secondary storage area could immediately write the data to non-volatile storage, and at some later point the secondary storage could delete the data upon determining that the data streams were successfully written by the primary storage area. Also, it should be noted that a storage area network (SAN) may be used as the storage system 140.

As described above, an operating environment can be a "trading room" for trading stocks, bonds, commodities, etc., in which a trader is taking and/or making calls to other traders, brokerages, banks, etc., which may have trades to make (buy or sell), information about accounts, information about trades, etc. In such an environment, it would not be uncommon for a calling agent, during the course of a few seconds, to make several calls, each of extremely short duration. In order to provide consistent and acceptable service to such traders, a system can be configured to record the activities at each trader desk, in order to properly sort out trades, and even allocate fault correctly by enabling playback of a session including peak activity.

Figure 3:
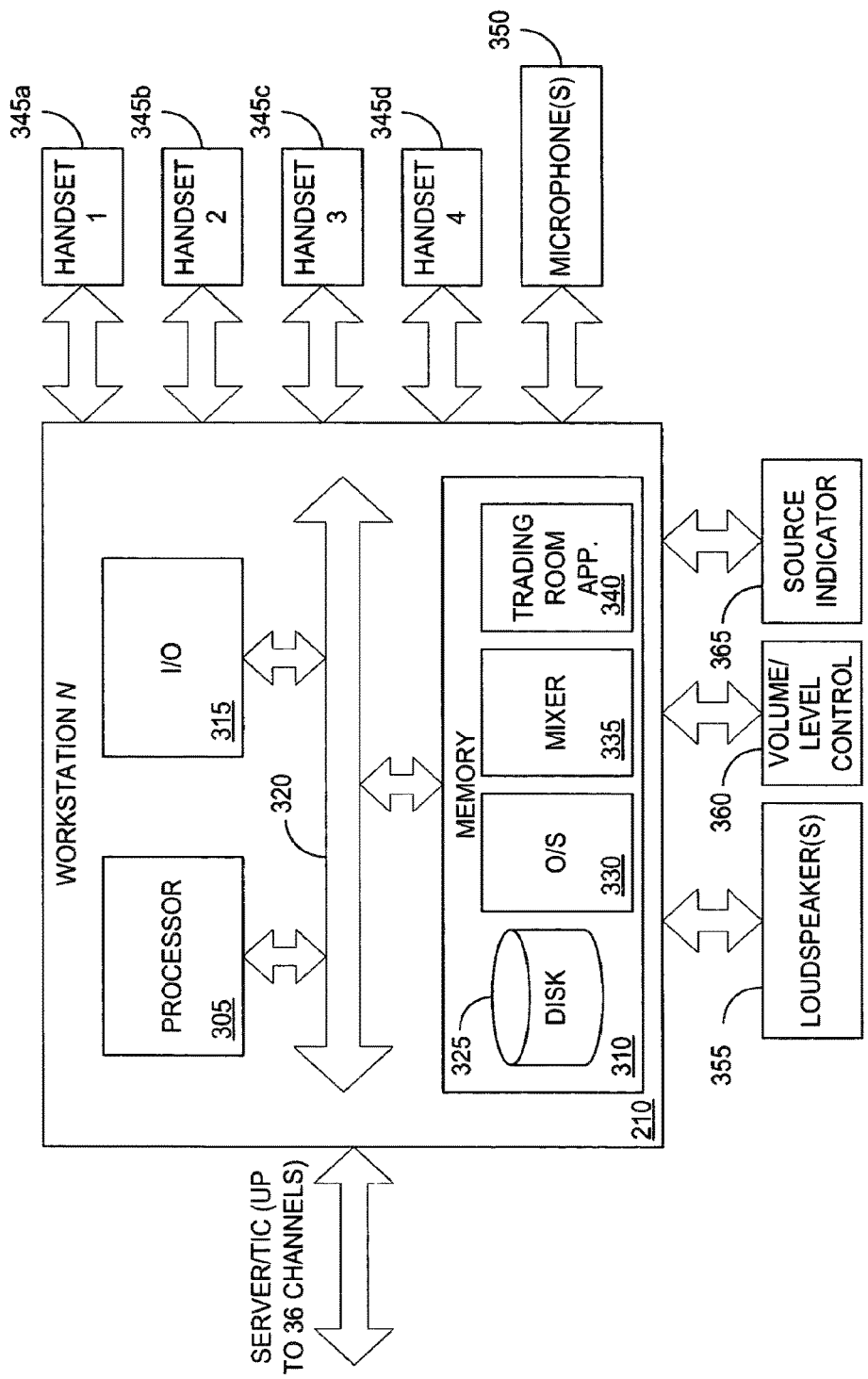
FIG. 3 is a block diagram illustrating an embodiment of a workstation architecture.

A workstation 210, as shown in FIG. 3, can include hardware and software mounted thereon. A workstation can be a computer, such as a turret available from IPC Information Systems, LLC of New York, N.Y. The hardware used can include a processor 305 which can be used to operate a real-time operating system or an industry standard O/S such as Windows. The hardware can further include a memory 310, which may include a hard disk 325, and I/O interfaces 315, connected together by a bus 320. Different hardware configurations may be used without departing from the spirit and scope of the present invention.

An example of a server can include a terminal interface card (TIC) 120 such as available from IPC Information Systems, LLC of New York, N.Y., as part of an overall trading system. The terminal interface card 120 can receive and distribute data for up to 16 workstations 210. Moreover, each workstation 210 can receive up to 36 channels of data. Further, the data streams sent to the workstation 210 can be received from a variety of different sources. For example, in some cases, a user may receive a signal from a private virtual circuit (PVC) while communicating with another brokerage house, a Headline News™ or Bloomberg™ stream to keep track of news affecting the markets, a telephone call, among many others. Each of these data streams may potentially be addressed to a particular trader workstation 210. Thus, the server 120 also acts as a centralized router for the data streams as they enter the trading floor and are distributed to the correct workstations 210.

With reference to FIG. 3, memory 310 includes an operating system 330 which is executable by the workstation 210. Memory 310 further includes a trading room application 340 which is operable to be executed by the processor 305. As is known in the art, the trading room application 340 can include a graphical user interface having button representations. Upon selection, these button representations connect the workstation to a telephone line. The telephone line can be directly connected to a counterparty (e.g. a source) or can automatically dial a pre-defined number based on the button representation pressed. Moreover, the graphical user interface of the trading room application 340 includes input for a plurality of microphones, a mixer having inputs which enable the trader to mix the incoming audio channels and adjust output levels of the incoming audio channels for output on one of several loudspeakers.

As may be understood, multiple applications 330,335,340 may be used by the trader on the workstation 210 in the course of trading. A configuration of the operating system 330 can include systems such as a Linux operating system available from RedHat, Inc. of Raleigh, N.C.

The trader's workstation 210 can be connected to many different types of peripheral devices 345-365 that enable the trader to efficiently perform his/her job. The peripheral devices can include multiple telephone handsets 345a-d. It should be noted that the telephone handset peripherals 345a-d can include both a speaker and a microphone, and therefore enable bi-directional communication with remote users via the server.

Other peripheral devices can be uni-directional peripheral devices 350, 355. These are uni-directional devices in the sense that they either transmit data or they receive data, but cannot do both. For example, a microphone 350 connected to the workstation 210 enables the trader to communicate information, often to other traders on the floor, via the server 120. However, the microphone 350 does not enable the trader to receive a data stream from other traders. Similarly, a loudspeaker 355 enables the trader to receive incoming data streams from other traders via the server, but does not enable the trader to send information to the other traders.

Still other peripheral devices such as a volume/level control 360 enable the trader to adjust the volume and settings of the signal sent to the loudspeaker(s) 355. A source indicator 365 driven by the trading room application 340 alerts the trader to an active data stream. An active data stream, for example, could be a data stream that has a signal being generated to the speaker by the trading room application 340. The source indicator can indicate that an amplitude of the signal exceeds a squelch threshold. It should be noted that the volume/level control 360 and the source indicator in various embodiments of the present disclosure can be implemented in hardware, software, or any combination thereof.

Figure 4:
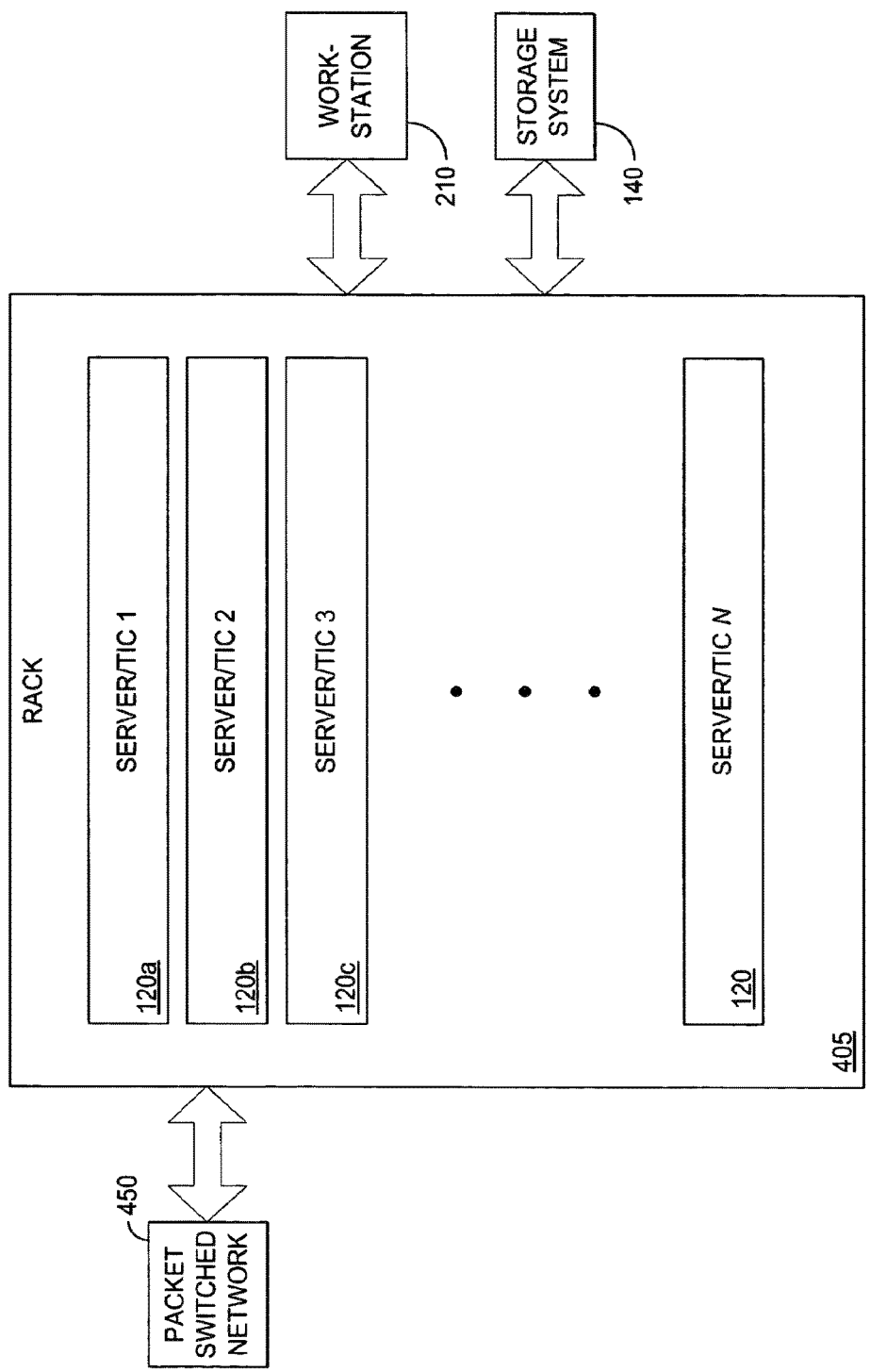
FIG. 4 is a block diagram illustrating an embodiment of a server architecture.

With reference to FIG. 4, hardware used on the rack 405 can include a number of terminal interface cards 420, available from IPC Information Systems, LLC of New York, N.Y. Many terminal interface cards 120a-c can be included in a rack 405, each one supporting 16 workstation turrets and switching the audio to and from them. The rack provides power to each of the terminal interface cards and a data bus (not shown) with which to communicate with the rest of the system. The terminal interface card 120 operates to route the incoming data streams, and will be discussed in further detail with reference to FIG. 5. Different hardware configurations may be used without departing from the spirit and scope of the present invention.

With continued reference to FIG. 4, the 110 interfaces include interfaces to a network. An embodiment of the present disclosure can include interfaces to a packet-switched network 450. The packet-switched network 450 receives the source data via several line cards, which are operable to interface, in various embodiments, to a private virtual circuit, the PSTN, and fixed tuner source. Each of these devices source at least one audio data stream for one of the workstations 210 coupled to the server 120. The server receives the sources, determines the correct recipient(s) of the audio data stream, and routes the audio data stream to that/those recipient(s) via a workstation interface, as is known in the art (e.g., Ethernet). The server also taps each of the audio data streams in accordance with configuration data contained in the data store 540, and sends the data to a storage system 140 via a storage system interface. Although shown separate, the storage system interface and packet switched network interface, in various embodiments of the present disclosure, are the same network interface. Furthermore, in various embodiments of the present disclosure, the server 120 is operable to interface with the storage system to subsequently retrieve data for one of the traders. In such an embodiment, the storage system itself would act as a data source for the workstation. A terminal interface card 120 can include the signal processing power which enables the card 120 to support audio transmission to and from the turrets that it controls. The terminal interface card 120 is responsible for receiving the incoming data streams from each of the myriad data sources, and routing the data streams to the appropriate destination. Furthermore, the terminal interface card 120 includes software operable to tap the data streams and send each of the data streams independently to a storage system. The terminal interface card 120 further includes software for compression of the data streams prior to sending the data streams to the storage system and/or to the workstations 210.

Figure 5:
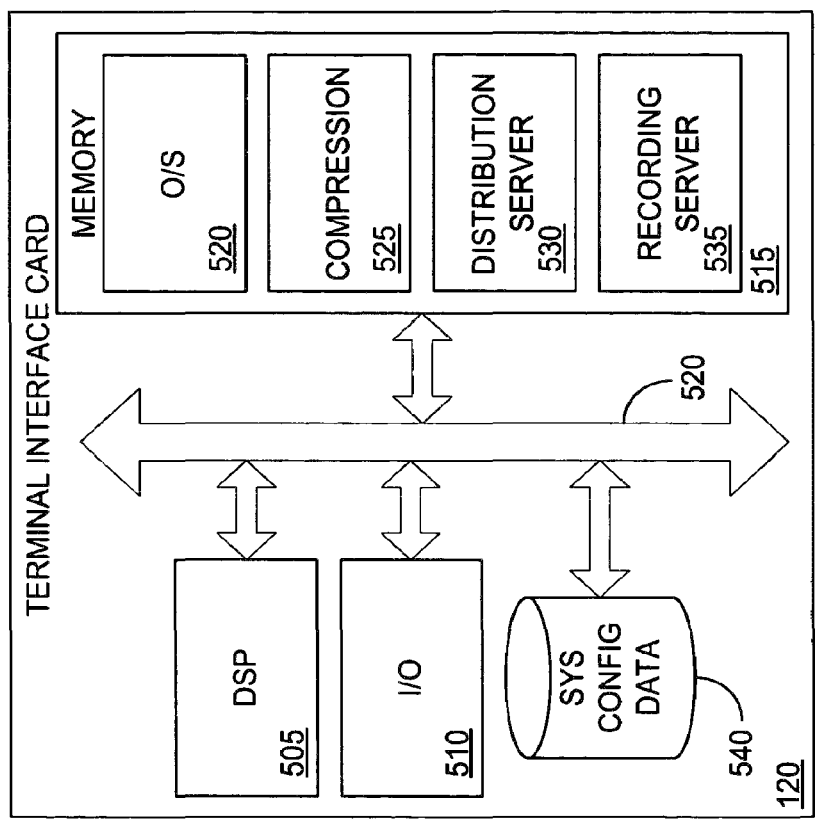
FIG. 5 is a block diagram illustrating a server architecture.

With reference to FIG. 5, the terminal interface card 120 can include a digital signal processor (DSP) 505, I/O 510 and memory 515 coupled together by a data bus 520. The DSP 505 can be responsible for the signal processing power of the terminal interface card 120. It should be understood that different hardware configurations may be used without departing from the spirit and scope of the present invention.

With continued reference to FIG. 5, memory 515 includes an operating system 520 which is executable by the server 120. The operating system 520 can be a lightweight real-time kernel. Memory 515 further includes compression software 525, distribution server software 530 and recording server software 535, each of which are executable by the DSP 505. The I/O 510 of the terminal interface card 120 further includes a network interface device, such as an Ethernet interface. As is known in the art, the network interface device can include driver software such as the distribution server software 530, enabling the server to interface with the network interface 510. The system configuration data store 540 includes the information which 30 facilitates a recording server 530 to tap the data streams passing through the terminal interface card 120, and send the data streams to a storage system 140, as is known in the art. The distribution server software 530 enables the terminal interface card 120 to distribute the incoming and outgoing data streams to any of a number of workstations 210. The recording server software 535 enables the terminal interface card 120 to tap each of the incoming and outgoing data streams, and send the tapped data streams to a storage system 140 in accordance with the data from the system configuration data store 540.

The compression software 525 enables the terminal interface card to compress the incoming and outgoing data streams to use less bandwidth in transferring each of the data streams. Moreover, the compressed data streams sent to the storage system 140 occupy less disk space than data streams which have not been compressed, and therefore remove some of the processing burden from the storage system 140. It should be noted that each data stream is recorded such that both the destination and source are recorded for each of the individual data streams. Previously a system would have recorded an audio stream purely because it was destined for, e.g. speaker 1, of turret/workstation.

In various embodiments of this disclosure, the stream is recorded if it comes from a source that is not already being recorded on one or two other recording channels. A stream could also be recorded if it comes from a source that is not already being recorded on "n" recording channels, where n can be configurable based on the degree of fault tolerance desired). If data from a particular source is already being recorded on "n" recording channels, the storage system 140 can decide to not store the data again. Instead, the storage system 140 merely notes that this speaker and/or destination was connected to a particular source at a particular time. When a user (e.g., a trader) requests replay of a particular speaker at a particular time, the storage system 140 retrieves the source associated with the audio from that speaker and plays it from the channel that the storage system 140 did record. It is the reliable and immediate inclusion of the source identification within the communication between terminal interface card 120 and storage system 140 that enables the storage system 140 to make decisions to effectively dispose of audio that would previously have been recorded. This audio would have been recorded because the storage system could not have been sure that the audio was being recorded already, since the source of the audio in real time may be unknown.

It should be recognized that there is a distinction between a telephone call (e.g., two streams: one TX one RX) and an audio stream (uni-directional). The storage system 140 replays a recording by searching for the individual streams that made up a call. Hence by recording each handset's mouthpiece, all microphone inputs and each external line input separately and without redundancy, the storage system 140 does not record speaker outputs or handset outputs. However, the storage system and a mixer can reconstitute any call by mixing the appropriate inputs/sources at the levels recorded. Hence, the source of every audio stream is recorded (e.g., immediately and reliably). This is achieved by using the terminal interface card to pass the source information along with the audio streams themselves. Thus, for example, when the storage system 140 receives the audio streams and the data about those audio streams, the storage system 140 can be used to perform recording optimization as disclosed herein.

Figure 6:
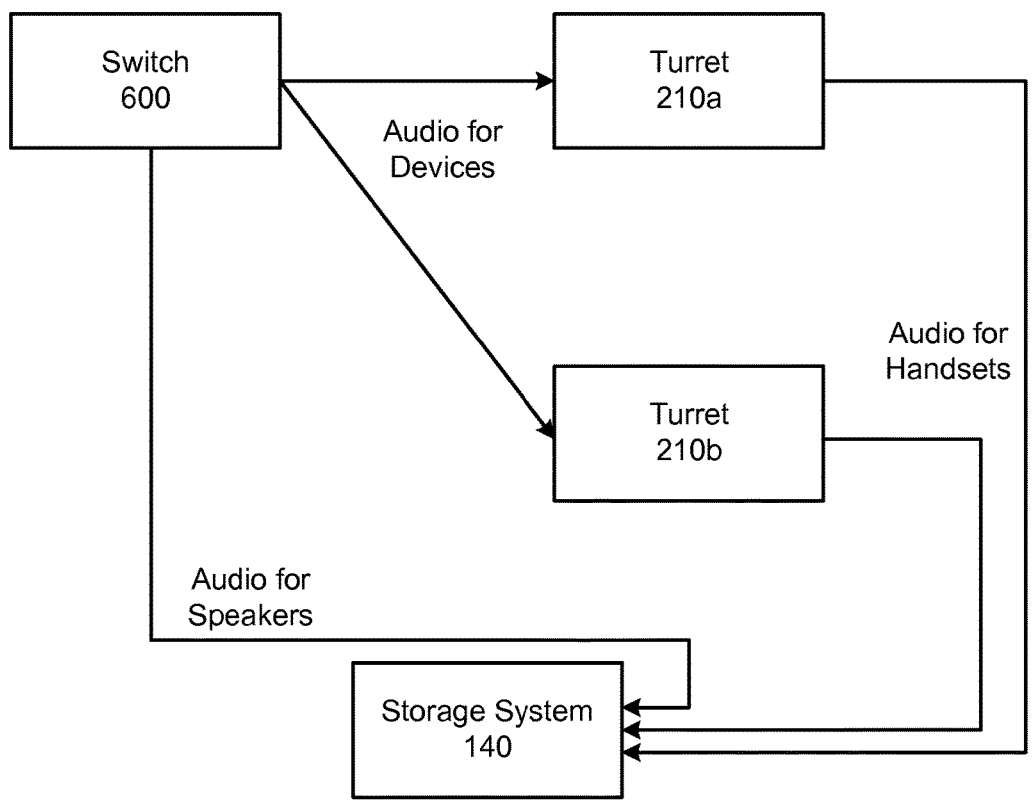
FIG. 6 is a flowchart illustrating an embodiment of a process for independently recording source data.

With reference to FIG. 6, there is illustrated aspects of central recording of speaker/intercom conversations in accordance with the present disclosure. Conventional solutions record at the endpoint (e.g., workstations/turret 210) in trading environments. Often because the workstation/turret 210 has 20 or more different channels, the channels are mixed together into a smaller number for recording purposes (e.g., 3-5 recording channels). For example, a workstation/turret with 2 handsets, an intercom and 16 speakers may be recorded on 4 channels. The first channel may include handset 1, the second channel may include handset 2 and intercom, and the remaining two channels having 8 speakers each. This causes a problem because multiple streams of audio are mixed together before recording. This makes it hard to understand individual conversations and also is different then what actually happened. With this arrangement, the speaker channels typically have the same audio for most or all of the workstations/turrets 210. Thus, the exact same audio is recorded for every workstation/turret 210 in the environment.

Thus, as a solution shown in FIG. 6, the speakers are recorded centrally in the storage system 140 while the handsets are recorded on each workstation/turret 210. Thus, a hybrid of station-side and trunk-side recording may be performed in accordance with the present disclosure. The station-side recording at the workstations/turrets 210 can be used for devices, such as handsets, that are expected to have unique streams of audio. The trunk-side recording can be used for the shared devices, such as speakers, that have the same audio provided to many different devices.

The above may be accomplished using time division multiplexing (TDM) trunk-side recording on the trunks used for speaker lines. For example, this may use IP Delivery or IP multicast. With IP Delivery, the handset channels will be coming from each workstation/turret 210, whereas the speaker trunks will be coming once from a central gateway or switch device 600. IP multicast option may be used as speaker and intercoms may be implemented as multicast. In this environment the storage system 140 may join a multicast group to which the workstations/turrets 210 are already joined in order to obtain a copy of the audio for the specific channels.

The above may be implemented on a per-call basis. For example, a speaker is attached to a 'call' which occurs over a trunk or channel on the switch. Multiple speakers from multiple devices can be joined to this same 'call' or channel. As such, the trunk/channel is only recorded once and it is associated to all the calls on all of the devices. Additionally or alternatively, the channel may be associated to all the speakers on which it is heard. Speakers may also have a microphone to provide for two-way communication.

In some implementations, the speaker audio for a specific call/trunk may be acquired from only one turret 210. If that turret 210 ever goes away you can start recording from a different turret. The microphone may be in a separate stream from the workstation/turret 210 that is speaking or it can be recorded from the central (single) stream or both. Redundancy may be accomplished via, duplicate forking, N+M, N+N tapping of TDM trunks/lines or multicast. The workstations/turrets 210 may optionally indicate where the audio can be recorded from centrally, or the indication may be provided by a second system (e.g., a CTI server) to obtain the mapping from speaker to trunk/line.

It is noted that the flowchart steps describing computer processes, computer components, software, etc. may be connected directly or indirectly to the other steps such that they enable the flow of the process described herein. In some embodiments of the present disclosure, the term processor includes code that performs software-type functions. This code can take the form of a subroutine, a software task, scripting languages, or any other type of code. It should be understood that processing can be implemented using a distributed architecture.

Thus, the software code could be spread across multiple machines in various embodiments of the present disclosure. The systems' and methods' data (e.g., associations, mappings, etc.) described herein may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.).

It is noted that data structures describe formats for use in organizing and storing data in databases, programs, memory, or other computer-readable media for use by a computer program. It should be further noted that the term "logic" (e.g., recording logic) can refer to (1) a process running on a particular piece, or across particular pieces, of hardware, (2) a particular piece of hardware, or a combination of (1) or (2) as the application at hand allows. The systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

What is claimed:

1. A system for hybrid trunk-side and station-side recording of audio information in a trading environment, comprising:
    a switch communicating via internet protocol (IP) for (i) the IP delivery of unique audio streams to particular devices based on an address and (ii) the IP multicast of shared audio to multiple devices based on a multicast group;
    at least one turret used by a trader to send or receive information to or from outside sources, wherein:
        each turret includes handsets receiving IP delivery of unique audio streams and speakers receiving IP multicast of shared audio, and wherein:
        each turret has handsets and speakers in excess of available channels for recording audio from each locally on the turret's memory without mixing, and wherein:
        each turret, records said unique audio streams locally on the turret's memory but does not record said shared audio locally on the turret's memory to prevent mixing of the unique audio streams on a channel for recording; and
    a storage system, that is physically separated from the turret and records the shared audio centrally by joining the multicast group.

2. The system according to claim 1, wherein the storage system subsequently acquires the unique audio streams recorded locally on the workstations for storage with the shared audio recorded centrally.

* * * * *